(12) United States Patent
Holland

(10) Patent No.: US 10,060,295 B2
(45) Date of Patent: Aug. 28, 2018

(54) REPAIR OF SURFACE DAMAGE AT EDGES OF CELLULAR PANELS

(71) Applicant: United Technologies Corporation, Hartford, CT (US)

(72) Inventor: Brian Kenneth Holland, Lansing, MI (US)

(73) Assignee: United Technologies Corporation, Farmington, CT (US)

( * ) Notice: Subject to any disclaimer, the term of this patent is extended or adjusted under 35 U.S.C. 154(b) by 423 days.

(21) Appl. No.: 14/768,805

(22) PCT Filed: Feb. 27, 2014

(86) PCT No.: PCT/US2014/018897
§ 371 (c)(1),
(2) Date: Aug. 19, 2015

(87) PCT Pub. No.: WO2014/134262
PCT Pub. Date: Sep. 4, 2014

(65) Prior Publication Data
US 2015/0377072 A1  Dec. 31, 2015

Related U.S. Application Data

(60) Provisional application No. 61/832,389, filed on Jun. 7, 2013, provisional application No. 61/771,419, filed on Mar. 1, 2013.

(51) Int. Cl.
F01D 25/30 (2006.01)
F02K 1/82 (2006.01)
(Continued)

(52) U.S. Cl.
CPC .............. *F01D 25/30* (2013.01); *B29C 73/14* (2013.01); *B64F 5/40* (2017.01); *F02K 1/46* (2013.01);
(Continued)

(58) Field of Classification Search
CPC .. F01D 25/30; F05D 2220/32; F05D 2230/60; F05D 2230/80
See application file for complete search history.

(56) References Cited

U.S. PATENT DOCUMENTS 4,759,812 A   7/1988  Miller
4,820,564 A   4/1989  Cologna et al.
(Continued)

FOREIGN PATENT DOCUMENTS

EP  1870228 A1  12/2007

OTHER PUBLICATIONS

International Preliminary Report on Patentability for International Application No. PCT/US2014/018897 dated Sep. 11, 2015.
(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

A method of working a non-conforming exhaust sleeve utilizes a first plate disposed over an outer surface of an exhaust sleeve and a second plate disposed over an inner surface. The exhaust sleeve includes an aft sleeve attached to an aft edge of a cellular layer and the first plate extends from the cellular layer onto the aft sleeve. The second plate is disposed along the inner surface of the cellular layer. A first plurality of fasteners secures the first plate to the second plate through the cellular layer and a second plurality of fasteners secures the first plate to the aft sleeve.

18 Claims, 4 Drawing Sheets

(51) Int. Cl.
*F02K 1/46* (2006.01)
*B29C 73/14* (2006.01)
*B64F 5/40* (2017.01)

(52) U.S. Cl.
CPC .......... *F02K 1/827* (2013.01); *F05D 2220/32* (2013.01); *F05D 2230/60* (2013.01); *F05D 2230/80* (2013.01); *F05D 2240/14* (2013.01)

(56) References Cited

U.S. PATENT DOCUMENTS

| | | | |
|---|---|---|---|
| 5,239,823 A | 8/1993 | Sims | |
| 5,927,647 A * | 7/1999 | Masters | F02K 1/72 239/265.19 |
| 5,980,174 A | 11/1999 | Gallagher et al. | |
| 6,656,299 B1 * | 12/2003 | Grosskrueger | B29C 73/02 156/293 |
| 7,546,684 B2 | 6/2009 | Caldwell et al. | |
| 7,722,318 B2 | 5/2010 | Addis | |
| 7,740,028 B1 * | 6/2010 | Wilson | F16L 55/1612 138/89 |
| 7,837,437 B2 | 11/2010 | Grady et al. | |
| 7,875,141 B2 | 1/2011 | Bogue et al. | |
| 7,883,760 B2 | 2/2011 | Bogue | |
| 8,993,090 B2 * | 3/2015 | Boulet | B29C 73/14 156/293 |
| 9,393,768 B2 * | 7/2016 | Dan-Jumbo | B29C 73/10 |
| 9,539,798 B2 * | 1/2017 | Georgeson | B32B 3/266 |
| 9,770,791 B2 * | 9/2017 | Hong | B23P 6/007 |
| 2003/0221411 A1 * | 12/2003 | Nesbitt | F02K 1/46 60/204 |
| 2006/0059828 A1 | 3/2006 | Stevenson et al. | |
| 2009/0165926 A1 * | 7/2009 | Stadtlander | C09J 5/00 156/94 |
| 2009/0208691 A1 | 8/2009 | Whitworth et al. | |
| 2009/0282664 A1 | 11/2009 | Holzhuter et al. | |
| 2009/0313825 A1 | 12/2009 | Harris et al. | |
| 2011/0030380 A1 * | 2/2011 | Widdle, Jr. | F02K 1/10 60/771 |
| 2011/0108357 A1 | 5/2011 | Vauchel et al. | |
| 2012/0066882 A1 * | 3/2012 | Hand | F02C 7/24 29/428 |
| 2012/0125523 A1 * | 5/2012 | Dupre | B23P 6/005 156/98 |
| 2012/0177878 A1 * | 7/2012 | Boulet | B29C 73/14 428/131 |
| 2012/0205192 A1 | 8/2012 | Bornert-Dano | |
| 2013/0292202 A1 | 11/2013 | Moutier et al. | |

OTHER PUBLICATIONS

Search Report and Written Opinion for Singapore Application No. 11201506186P dated Feb. 23, 2016.
Baker, Dr. A.A., Repair Techniques for Composite Structures, Composite Materials in Aircraft Structures, Jan. 1, 1990, pp. 207-227.
European Search Report for EP Application No. 14757606.0 dated Oct. 24, 2016.
International Search Report and Written Opinion for International Application No. PCT/US2014/018897 dated Jun. 23, 2014.

* cited by examiner

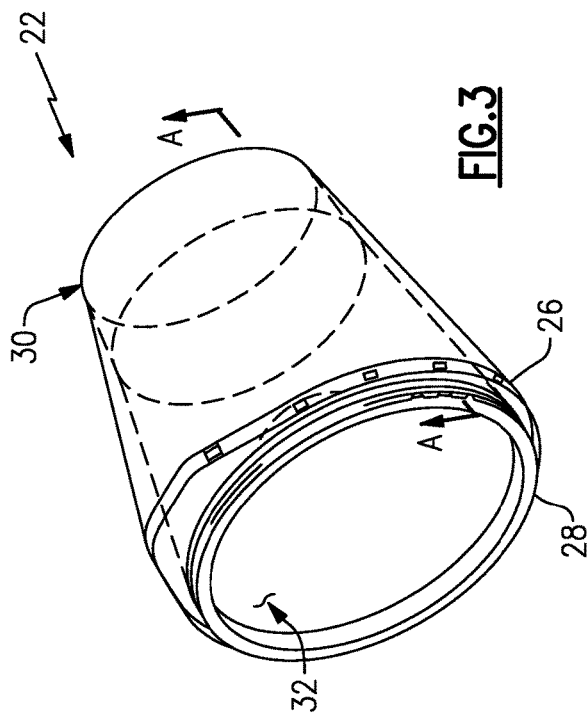
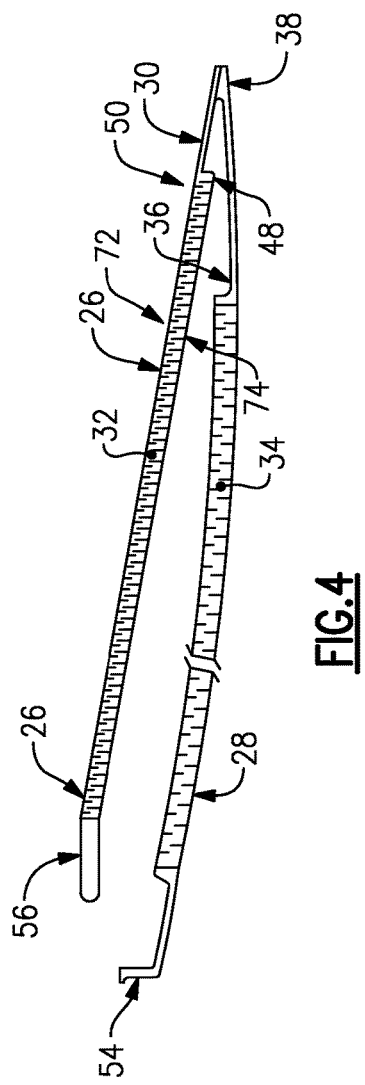
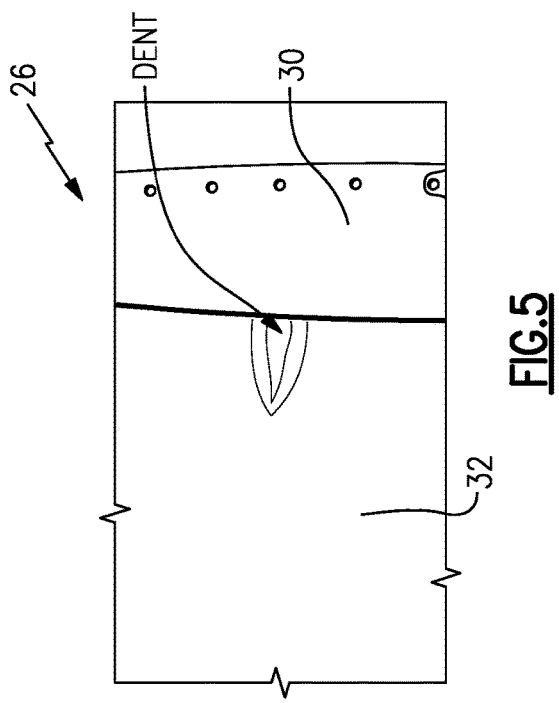

REPAIR OF SURFACE DAMAGE AT EDGES OF CELLULAR PANELS

BACKGROUND

A gas turbine engine typically includes a fan section and a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. Exhaust gas flow exits the core engine and flows through an exhaust nozzle. The exhaust nozzle controls gas flow and provides for smooth airflow for expansion and exhaust of exhaust gases from the core engine.

The exhaust nozzle can include inner and outer sleeve assemblies that are attached to each other at one end. The inner sleeve includes honeycomb panels and the outer sleeve assembly may be fabricated from metal material and includes a seal and a number of rub strips. An exhaust nozzle is an expensive highly engineered component of the gas turbine engine. Accordingly, repairs procedures for damage are desired instead of replacement.

Accordingly, it is desirable to develop repair techniques to correct minor damage that maintain the desired structural integrity and performance requirements for the nozzle assembly.

SUMMARY

A method of working an exhaust nozzle according to an exemplary embodiment of this disclosure, among other possible things includes placing a first plate along an outer surface of the exhaust nozzle over a non-conforming area, placing a second plate along an inner surface of the exhaust nozzle, and attaching the first plate to the second plate sandwiching the non-conforming area of the outer sleeve therebetween.

In a further embodiment of the foregoing method, the first plate and the second plate are riveted together.

In a further embodiment of any of the foregoing methods, includes the step of spacing the rivets apart from the non-conforming area in an axial direction and a radial direction.

In a further embodiment of any of the foregoing methods, includes the step of spacing the rivets apart from a weld joint of the exhaust nozzle in an axial direction and a radial direction.

In a further embodiment of any of the foregoing methods, includes placing the first plate on the outer surface of the exhaust nozzle to overlap an aft sleeve and attaching the first plate to the aft sleeve.

In a further embodiment of any of the foregoing methods, includes spacing the first plate apart from an aft edge of the aft sleeve.

In a further embodiment of any of the foregoing methods, the outer surface includes a cellular panel abutted against the aft sleeve. An interface between the aft sleeve and the cellular panel on the outer surface includes an aft seam and the first plate is placed on the outer surface to extend from the cellular panel over the aft seam and attached to the aft sleeve.

In a further embodiment of any of the foregoing methods, the interface between the cellular panel and the aft sleeve on the inner surface includes an aft channel and the second plate includes an aft edge that is spaced apart from the aft channel.

In a further embodiment of any of the foregoing methods, the non-conforming area includes a dent that extends from the interface between the cellular panel and the aft sleeve.

A patch for an exhaust sleeve according to an exemplary embodiment of this disclosure, among other possible things includes a first plate disposed over an outer surface of an exhaust sleeve. The exhaust sleeve includes an aft sleeve attached to an aft edge of a cellular layer and the first plate extends from the cellular layer onto the aft sleeve. A second plate is disposed along an inner surface of the cellular layer. A first plurality of fasteners secures the first plate to the second plate through the cellular layer. A second plurality of fasteners secures the first plate to the aft sleeve.

In a further embodiment of the foregoing patch, the aft sleeve includes an aft channel on the inner surface and the second plate is spaced apart from the aft channel.

In a further embodiment of any of the foregoing patches, the first plate is axially longer than the second plate.

In a further embodiment of any of the foregoing patches, the first plurality of fasteners include rivets extending through the cellular material and the second plurality of fasteners include rivets extending through the first plate and the aft sleeve.

In a further embodiment of any of the foregoing patches, the first plurality of fasteners and the second plurality of fastener spaced apart from a damaged area of the cellular layer.

In a further embodiment of any of the foregoing patches, the first plurality of fasteners and the second plurality of fasteners are spaced apart from a joint between the aft sleeve and the cellular layer.

In a further embodiment of any of the foregoing patches, includes the step of machining the fasteners to provide a smooth surface along an airflow path.

In a further embodiment of any of the foregoing patches, includes the step of tapering at least one of the first plate and the second plate to define a smooth surface along an airflow path.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is another perspective view of the example exhaust nozzle assembly.

FIG. 4 is a partial cross-section of a portion of the example exhaust nozzle.

FIG. 5 is a view of a damaged portion of an example exhaust nozzle.

DETAILED DESCRIPTION

Figure 1:
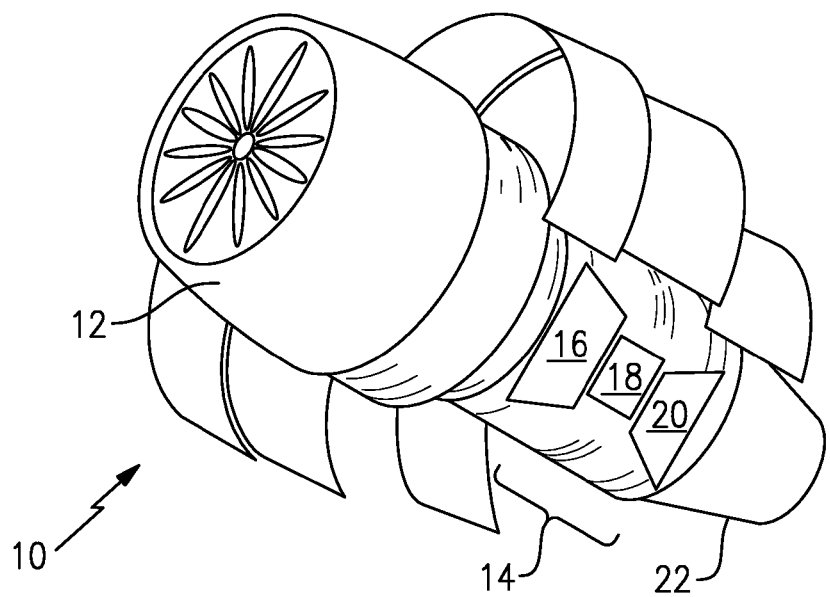
FIG. 1 is a schematic view of an example gas turbine engine.
Figure 2:
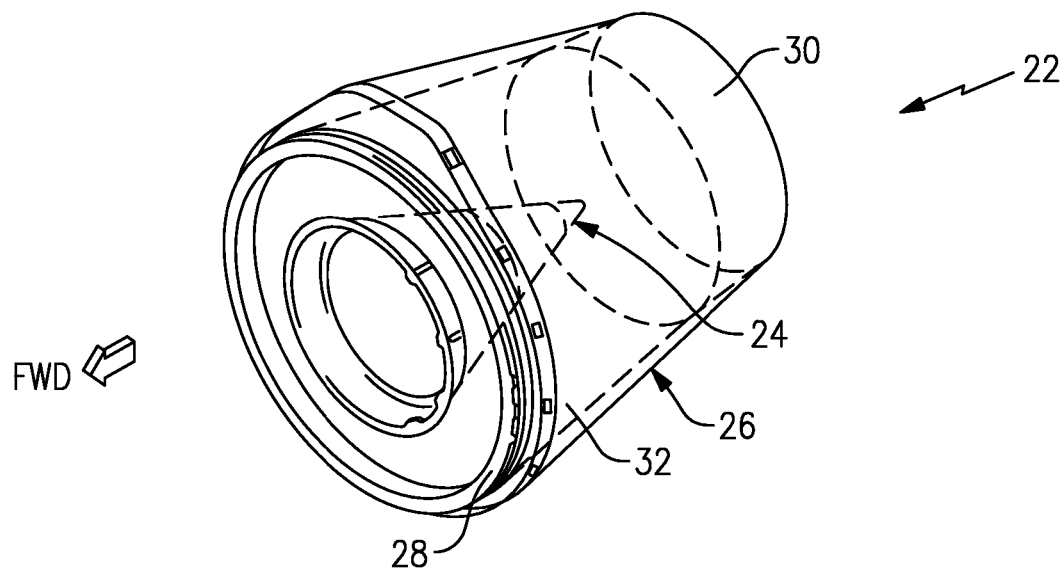
FIG. 2 is a perspective view of an example exhaust nozzle assembly.

Referring to the FIGS. 1 and 2, an example gas turbine engine 10 is schematically shown and includes a fan section 12 and a core engine 14 including a compressor section 16, a combustor section 18 and a turbine section 20. The fan section 12 drives air along a bypass flow path while the compressor section 16 draws air in along a core flow path C where air is compressed and communicated to the combustor section 18. In the combustor section 18, air is mixed with fuel and ignited to generate a high energy exhaust gas stream that expands through the turbine section 20 where energy is extracted and utilized to drive the fan section 12 and the compressor section 16. An exhaust nozzle 22 along with a plug 24 provides a path for the smooth expansion of exhaust gases exhausted from the turbine section 20.

The exhaust nozzle 22 includes an inner sleeve assembly 28 attached to an outer sleeve assembly 26 to define a path for the exhaust gases. The outer sleeve assembly 26 includes the cellular panel 32 that is attached to an aft sleeve 30. The cellular panel 32 includes a plurality of cells covered by a face sheet.

Referring to FIGS. 3 and 4, the exhaust nozzle 22 is shown without the plug 24 and includes the inner sleeve assembly 28 attached to the outer sleeve assembly 26 at an aft attachment member 38. The inner sleeve assembly 28 and the outer sleeve assembly 26 each include the cellular panels 32, 34 that are attached to a corresponding rigid aft sleeve. The inner sleeve assembly 26 includes a forward ring 54, the aft channel 36, and the aft inner sleeve 38 that is attached to the aft outer sleeve 30.

The aft outer sleeve 30 includes an aft channel 48 that is disposed at an aft edge of the cellular panel 32. The aft sleeve 30 is attached to the cellular panel 32 at a weld joint 52. The weld joint 52 extends about the circumference of the nozzle 22. The outer sleeve assembly 26 includes a radially outer surface 72 and a radially inner surface 74. The aft channel 48 is disposed on the inner surface 74.

Referring to FIG. 5, dents or other types of non-conforming areas to the cellular panel 32 are sometimes found during inspection. Because the exhaust nozzle 22 is an expensive part, repairs to maintain structural integrity and function are desired rather than replacement when possible.

Some non-conforming or damaged areas may be beyond current limits for current repair procedures. In some instances a plate of similar metal material is welded over the damaged area. However, in some areas such a repair is neither desirable nor effective. Moreover, the honeycomb structure presents challenges to welding processes. Furthermore, repairs utilizing welding of a plate are typically required to extend completely around the damaged area and therefore may not be applicable to damage along the edge areas.

The dent illustrated in FIG. 5 extends from an interface between the cellular panel 32 and the aft sleeve 30 and therefore is difficult to work and/or repair. The disclosed method of working and patch provides a correction of the non-conforming areas. It should be understood that although the disclosed method is illustrated and described as a repair, it may also be utilized in other situations and conditions to correct non-conforming areas of an exhaust nozzle.

Figure 6:
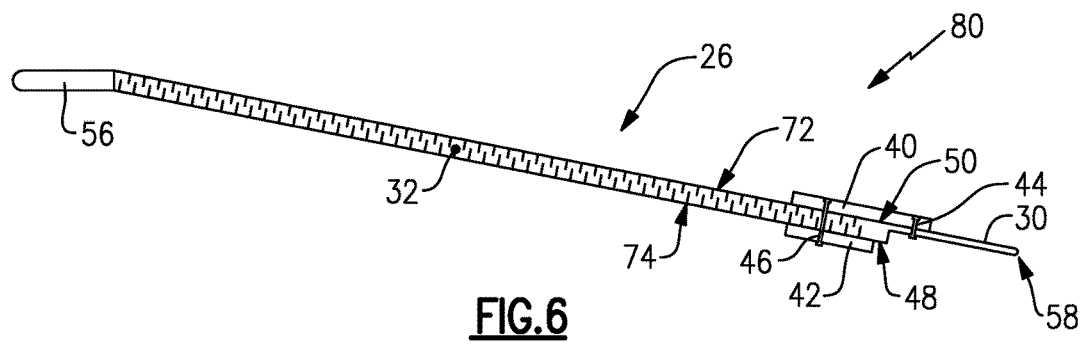
FIG. 6 is a cross-section of a repaired portion of the example exhaust nozzle.
Figure 7:
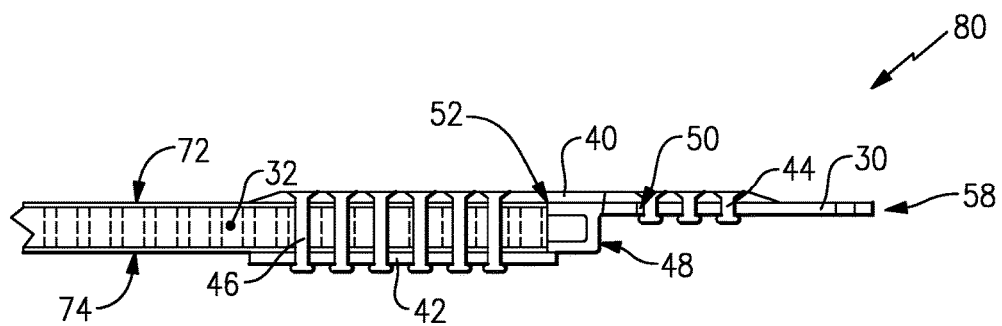
FIG. 7 is an enlarged cross-section of the repaired portion of the example exhaust nozzle.

Referring to FIGS. 6 and 7, an example repair 80 utilizes a top or first plate 40 commonly referred to as a doubler on the outer surface 72 of the outer sleeve assembly 26. The first plate 40 overlaps the aft sleeve 30 and is held in place by rivets 44. The first plate 40 removes the load from the solid skin 72 of the outer sleeve 26 and the damaged area. A back or second plate 42 is provided in place over the inner surface 74 of the outer sleeve 26 and provides a solid structure for attachment of a first plurality of rivets 46. The first plate 40 and second plate 42 sandwich the cellular panel 32 therebetween to provide the desired strength and load bearing capability. The rivets 46 extend through the cellular panel 32 and secure the first plate 40 to the second plate 42. Moreover, the second plate 42 bears the load along a larger surface, and not just the edges of the cellular panel 32.

The example repair method utilizes the first plate 40 that is riveted to both the aft sleeve 30 and to the second plate 42. The second plate 42 provides the surface area for securing rivets 46 to sandwich the cellular panel 32 therebetween. The inner surface 74 includes the channel 48 that has a thickness step, so it does not allow the second plate 42 to extend to the inner surface of the aft sleeve 30. Accordingly, the first plate 40 on the outer surface of the outer sleeve 26 is longer the second plate 42 and extends over a seam 50 between the cellular panel 32 and the aft sleeve 30. The first plate 40 also extends over a weld joint 52 between the cellular panel 32 and the aft sleeve 30.

The first plate 40 is secured to the second plate 42 by a first plurality of rivets 46 that extend through the cellular panel 32. The first plate 40 is secured to the aft sleeve 30 by a second plurality of rivets 44. The second plurality of rivets 44 are attached only to the aft sleeve 30 and not to the cellular panel 32 or the second plate 42. Although rivets are disclosed, other fasteners as are known may also be utilized and are within the contemplation of this disclosure.

Figure 8:
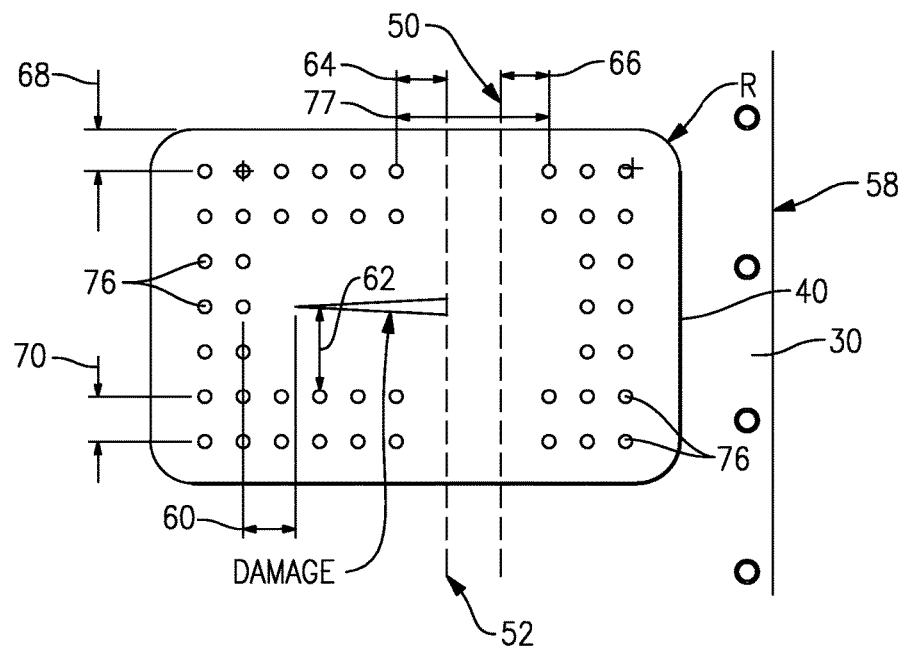
FIG. 8 is a top view of the example repaired portion.
Figure 9:
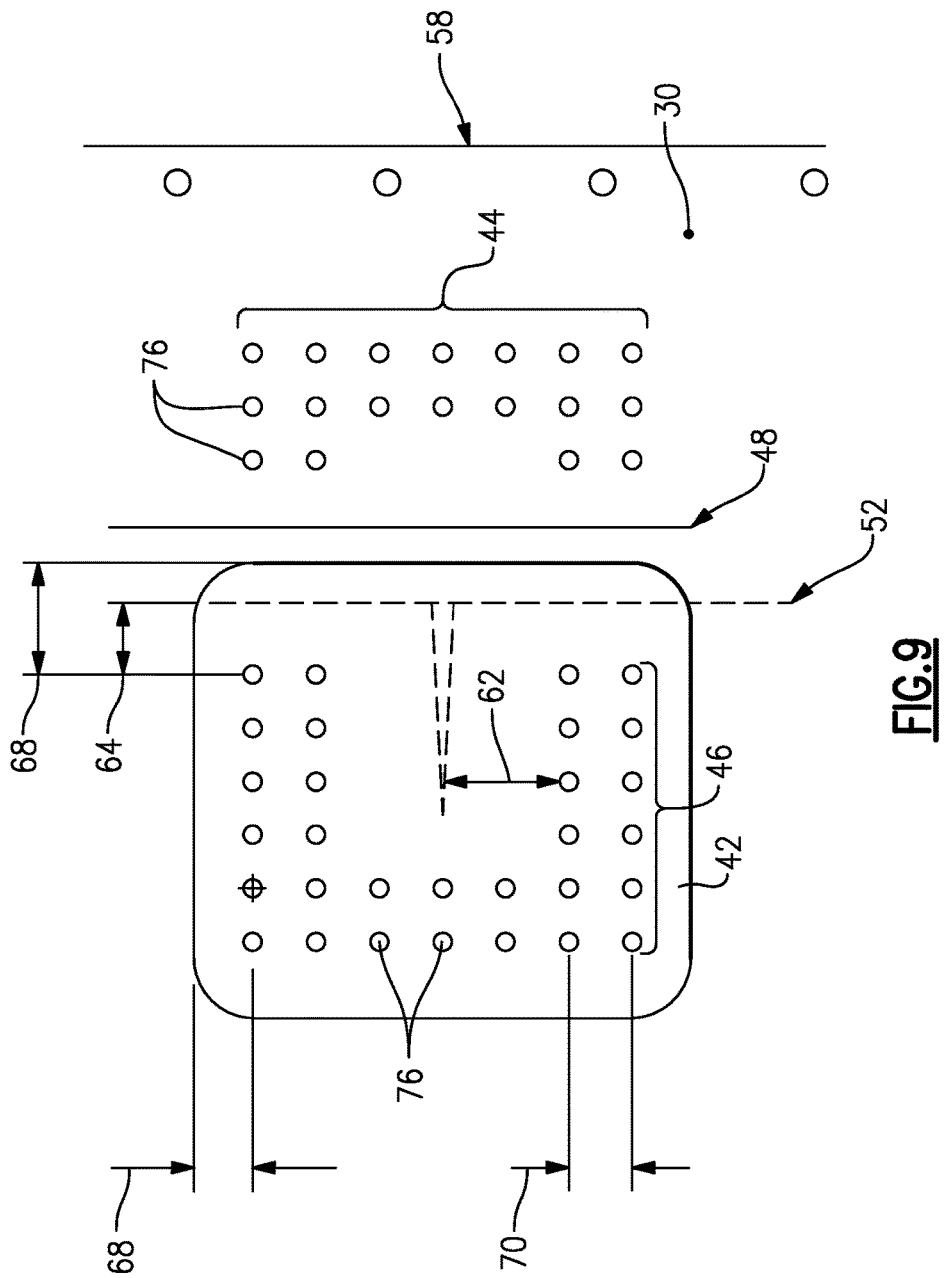
FIG. 9 is a bottom view of the example repaired portion.

Referring to FIGS. 8 and 9, the first plate 40 and the second plate 42 include openings 76 that define the location of both the first plurality of rivets 46 and the second plurality of rivets 44. The rivets are spaced apart a desired distance depending on the specific structural repair. The rivet spacing is provided to maintain the material strength of the parent material while also preventing the rivets from applying stress to weld joint between the aft sleeve 30 and the other parts of the outer sleeve 26.

The openings 76, and thereby the corresponding rivets are spaced apart from the damaged area an axial distance 60 and a radial distance 62. The openings 76 for the rivets are further spaced apart from the weld joint 52 by an axial distance 64. Further, the rivets are also spaced apart from the second weld joint 50 by an axial distance 66. The openings for the rivets 76 are further spaced apart from each other a distance 70. The openings 76 must not be spaced more than axial length 77. The openings 76 are spaced apart from the end of plate 42 a distance 68.

The method of repairing the non-conforming and/or damaged area includes the first step of placing the first plate 40 on to the outer surface 72 over the damaged area. The second plate 42 is then placed against the inner surface 74 in a position corresponding to the first plate 40. The first plate 40 is placed to overlap the damaged area, the weld joint 52 and the second weld joint 50 to extend onto the aft sleeve 30. The first plate 40 must be large enough to hold the required number of rivets to transfer the load over the damage. The weld joints 50 and 52 may require burnishing to ensure the plates 40 and 42 sit flat on the surfaces 72 and 74 respectively. The second plate 42 overlaps the weld joint 52 on the inner surface 74 and is spaced apart from the aft channel 48. The first plate 40 is spaced apart an axial distance from the aft edge 58 of the aft sleeve 30.

The placement of the first plate 40 and the second plate 42 relative to the damaged area and the features of the exhaust liner define the location of the openings 76 for the corresponding rivets. The openings 76 are tailored to provide the required spacing to bear and transfer any loads around the damaged area. Accordingly, the openings 76 are generated in each of the first and second plates 40, 42 depending on the size and shape of the damaged area. The openings 76 may be formed with the plates 40, 42 in place on the exhaust liner assembly 20, or may be machined prior to placement to the outer sleeve assembly 26.

Once the first and second plates 40, 42 are in position, the first plurality of rivets 46 is installed. Each of the first plurality of rivets 46 extends through the cellular panel 32 to attach between the first plate 40 and the second plate 42. The first plurality of rivets 46 sandwich the cellular panel 32 around the damaged area.

The second plurality of rivets 44 are then installed to secure the first plate 40 to the aft sleeve 30. The second plurality of rivets 44 secures only the first plate 40 to the aft sleeve 30. The first and second plurality of rivets 44 may be machined or otherwise modified to provide a smooth surface along an airflow path. Further, at least one or both the first plate 40 and the second plate 42 can include a smooth and/or tapered edge surface to define a smooth surface along the airflow path.

The resulting repair 80 transfers loads around the damaged area through the first plate 40 and the second plate 42. Moreover, the loads are transferred around the damaged area without further damage or modification to the cellular panel 32.

Accordingly, the example working and repair method provides for the correction of non-conforming and/or damaged areas at the edge surfaces of an exhaust nozzle.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of repairing an exhaust nozzle comprising:
   placing a first plate along an outer surface of the exhaust nozzle over a non-conforming area, wherein the outer surface comprises a cellular panel abutted against the aft sleeve;
   placing a second plate along an inner surface of the exhaust nozzle; and
   attaching the first plate to the second plate sandwiching the non-conforming area of the outer surface therebetween, wherein an interface between the aft sleeve and the cellular panel on the outer surface comprises an aft seam and the first plate is placed on the outer surface to extend from the cellular panel over the aft seam and attached to the aft sleeve.

2. The method as recited in claim 1, wherein the first plate and the second plate are riveted together using rivets.

3. The method as recited in claim 2, including spacing the rivets apart from the non-conforming area in an axial direction and a radial direction.

4. The method as recited in claim 2, including spacing the rivets apart from a weld joint of the exhaust nozzle in an axial direction and a radial direction.

5. The method as recited in claim 2, including placing the first plate on the outer surface of the exhaust nozzle to overlap an aft sleeve and attaching the first plate to the aft sleeve.

6. The method as recited in claim 5, including spacing the first plate apart from an aft edge of the aft sleeve.

7. The method as recited in claim 1, wherein the interface between the cellular panel and the aft sleeve on the inner surface includes an aft channel and the second plate includes an aft edge that is spaced apart from the aft channel.

8. The method as recited in claim 1, wherein the non-conforming area comprises a dent that extends from the interface between the cellular panel and the aft sleeve.

9. A patch for a non-conforming portion of an exhaust sleeve comprising:
   a first plate disposed over an outer surface of an exhaust sleeve, wherein the exhaust sleeve includes an aft sleeve attached to an aft edge of a cellular layer and the first plate extends from the cellular layer onto the aft sleeve;
   a second plate disposed along an inner surface of the cellular layer, wherein the first plate is axially longer than the second plate;
   a first plurality of fasteners securing the first plate to the second plate through the cellular layer; and
   a second plurality of fasteners securing the first plate to the aft sleeve.

10. The patch as recited in claim 9, wherein the aft sleeve includes an aft channel on the inner surface and the second plate is spaced apart from the aft channel.

11. The patch as recited in claim 9, wherein the first plurality of fasteners comprise rivets extending through the cellular material and the second plurality of fasteners comprise rivets extending through the first plate and the aft sleeve.

12. The patch as recited in claim 9, wherein the first plurality of fasteners and the second plurality of fastener spaced apart from a damaged area of the cellular layer.

13. The patch as recited in claim 9, wherein the first plurality of fasteners and the second plurality of fasteners are spaced apart from a joint between the aft sleeve and the cellular layer.

14. The patch as recited in claim 13, wherein the fasteners are machined to provide a smooth surface along an airflow path.

15. The patch as recited in claim 9, wherein at least one of the first plate and the second plate is tapered to define a smooth surface along an airflow path.

16. A patch for a non-conforming portion of an exhaust sleeve comprising:
   a first plate disposed over an outer surface of an exhaust sleeve, wherein the exhaust sleeve includes an aft sleeve attached to an aft edge of a cellular layer and the first plate extends from the cellular layer onto the aft sleeve;
   a second plate disposed along an inner surface of the cellular layer;
   a first plurality of fasteners securing the first plate to the second plate through the cellular layer; and
   a second plurality of fasteners securing the first plate to the aft sleeve, wherein the first plurality of fasteners and the second plurality of fasteners are spaced apart from a joint between the aft sleeve and the cellular layer.

17. The patch as recited in claim 16, wherein the aft sleeve includes an aft channel on the inner surface and the second plate is spaced apart from the aft channel.

18. The patch as recited in claim 16, wherein the first plurality of fasteners comprise rivets extending through the cellular material and the second plurality of fasteners comprise rivets extending through the first plate and the aft sleeve.

\* \* \* \* \*